R. H. SPHAR & E. OSTERMIER.
ADJUSTING MECHANISM FOR THE LAMPS OF AUTOMOBILES.
APPLICATION FILED MAY 19, 1911.
999,129.
Patented July 25, 1911.
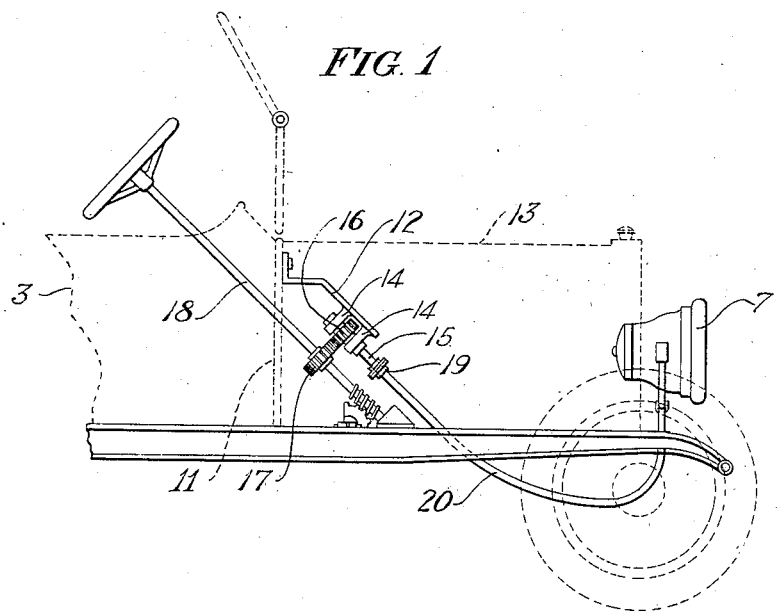
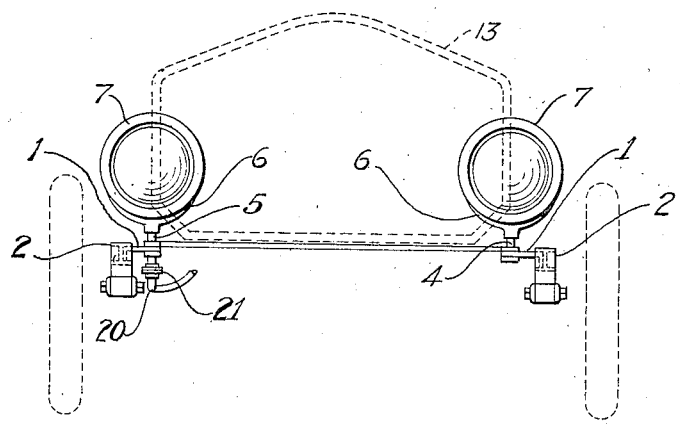
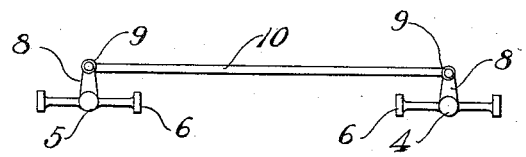
WITNESSES:
INVENTORS,
RUSSELL H. SPHAR.
EDWARD OSTERMIER
BY
ATTORNEYS.

UNITED STATES PATENT OFFICE.

RUSSELL H. SPHAR AND EDWARD OSTERMIER, OF CHARLEROI, PENNSYLVANIA.

ADJUSTING MECHANISM FOR THE LAMPS OF AUTOMOBILES.

999,129.     Specification of Letters Patent.   Patented July 25, 1911.

Application filed May 19, 1911. Serial No. 628,211.

*To all whom it may concern:*

Be it known that we, RUSSELL H. SPHAR and EDWARD OSTERMIER, citizens of the United States of America, residing at Charleroi, in the county of Washington and State of Pennsylvania, have invented certain new and useful Improvements in Adjusting Mechanism for the Lamps of Automobiles, of which the following is a specification, reference being had therein to the accompanying drawing.

This invention relates to an adjusting mechanism for the lamps of automobiles, and the objects of our invention are to provide positive and reliable means, in a manner as will be hereinafter set forth, for swinging the lamps of an automobile to illuminate a path for the vehicle, and to afford means of the above type that will be automatically shifted by the steering post of the machine.

Further objects of the invention are to provide an adjusting mechanism for automobile lamps that can be applied to the present types of machines, and to accomplish the above results by a mechanical construction that is simple, durable and inexpensive to manufacture.

With the above and other objects in view, the invention resides in the novel construction, combination and arrangement of parts to be hereinafter specifically described and then claimed.

Reference will now be had to the drawing, wherein:—

Figure 1 is a side elevation of the adjusting mechanism, Fig. 2 is a front elevation of the same, and Fig. 3 is a plan of a portion of the mechanism.

The reference numerals 1 denote brackets secured to the inner forward sides of the frames 2 of an automobile 3, and rotatably mounted in these brackets are the pins 4 and 5 of lamp holders 6 having lamps 7. The pins 4 and 5 are provided with rearwardly extending cranks 8 having the ends thereof pivotally connected by pins 9 to the ends of a connecting rod 10, said connecting rod causing the pins 4 and 5 to shift in unison.

The dashboard 11 of the automobile 3 is provided with a forwardly extending bracket 12 located within the hood or casing 13 of the automobile. The bracket 12 has bearings 14 for a shaft 15. Mounted upon the shaft 15 between the bearings 14 is a gear wheel 16 meshing with a gear wheel 17 mounted upon the steering post 18 of the automobile.

Connected to the lower end of the shaft 15 by a coupling 19 is a flexible shaft 20 having the opposite end thereof connected by a coupling 21 to the lower end of the pin 5.

The steering post 18 is a conventional form common to various types of automobiles, and when it is desired to equip an automobile with the lamp adjusting mechanism, it is only necessary to provide the post 18 with the gear wheel 17 and install the remaining parts. When the steering post 18 is moved, the movement of the post is transmitted to the gear wheel 16 and through the medium of the flexible shaft 20, the pin 5 is rotated in unison with the pin 4. The lamps 7 will be swung in a line parallel to the direction in which the forward wheels of the automobile are traveling, and the advantage of such adjustment is particularly apparent when an automobile is passing around a curve or corners at the intersections of streets.

While in the drawings there is illustrated a preferred embodiment of the invention, it is to be understood that the structural elements thereof are susceptible to such changes as fall within the scope of the appended claim.

What we claim is:—

In an adjusting mechanism for the lamps of automobiles, the combination with side frames and brackets carried by the forward inner sides thereof, of pins rotatably mounted in said brackets, lamp holders carried by the upper ends of said pins, a connecting bar adapted to cause said pins to rotate in unison, a forwardly extending bracket carried by the dashboard of said automobile, bearings carried by said bracket, a shaft journaled in said bearings, a gear wheel mounted upon said shaft, a gear wheel adapted to be carried by the steering post of said automobile to mesh with said gear wheel, and a flexible shaft coupled to the end of the last mentioned shaft and to the end of one of said pins, substantially as described.

In testimony whereof we affix our signatures in the presence of two witnesses.

RUSSELL H. SPHAR.
EDWARD OSTERMIER.

Witnesses:
I. O. WYCOFF,
GUS BODSON.